United States Patent
Badi et al.

(10) Patent No.: US 8,156,283 B2
(45) Date of Patent: Apr. 10, 2012

(54) PROCESSING FUNCTION CONNECTED TO PROCESSOR MEMORY HIERARCHY

(75) Inventors: Eric L. P. Badi, Cagnes-sur-Mer (FR); Serge B. Lasserre, Plascassier (FR)

(73) Assignee: Texas Instruments Incorporated, Dallas, TX (US)

( * ) Notice: Subject to any disclaimer, the term of this patent is extended or adjusted under 35 U.S.C. 154(b) by 941 days.

(21) Appl. No.: 11/862,335

(22) Filed: Sep. 27, 2007

(65) Prior Publication Data
US 2008/0282033 A1    Nov. 13, 2008

(30) Foreign Application Priority Data
May 10, 2007  (EP) ................................. 07290587

(51) Int. Cl.
G06F 13/00    (2006.01)
G06F 13/12    (2006.01)

(52) U.S. Cl. ........ 711/117; 711/118; 711/130; 711/147; 711/150; 711/152

(58) Field of Classification Search .................. 711/117, 711/118, 130, 147, 150, 152
See application file for complete search history.

(56) References Cited

U.S. PATENT DOCUMENTS

| | | | | |
|---|---|---|---|---|
| 5,388,245 A * | 2/1995 | Wong | .............................. | 711/118 |
| 5,689,679 A * | 11/1997 | Jouppi | ........................... | 711/122 |
| 5,752,071 A * | 5/1998 | Tubbs et al. | .................... | 712/34 |
| 6,006,299 A * | 12/1999 | Wang et al. | .................... | 710/108 |
| 6,751,706 B2 * | 6/2004 | Chauvel et al. | ................ | 711/122 |
| 7,292,557 B2 * | 11/2007 | Neumann et al. | ............. | 370/337 |
| 2002/0073282 A1 * | 6/2002 | Chauvel et al. | ................ | 711/122 |
| 2004/0123074 A1 * | 6/2004 | Klein | ............................... | 712/34 |

* cited by examiner

*Primary Examiner* — Yong Choe
*Assistant Examiner* — Samuel Dillon
(74) *Attorney, Agent, or Firm* — Ronald O. Neerings; Wade James Brady, III; Frederick J. Telecky, Jr.

(57) ABSTRACT

Apparatus and method for employing a Hardware Processing Function in a processor system using a hierarchical memory. Embodiments of the disclosed invention may be used to enhance processor performance and functionality while maintaining cache coherency and reducing cache pollution. A system includes a processor, a hierarchical memory system coupled to the processor, and a Hardware Processing Function coupled to the hierarchical memory system. The processor is configured to decode an instruction and the hierarchical memory system is configured to execute the instruction. The instruction directs the memory system to perform a data manipulation. The processor transfers a value to the memory system. The value comprises a location of source data to be manipulated, a selection of a Hardware Processing Function to perform the data manipulation, and a destination storage location where the manipulated data is to be stored.

25 Claims, 3 Drawing Sheets

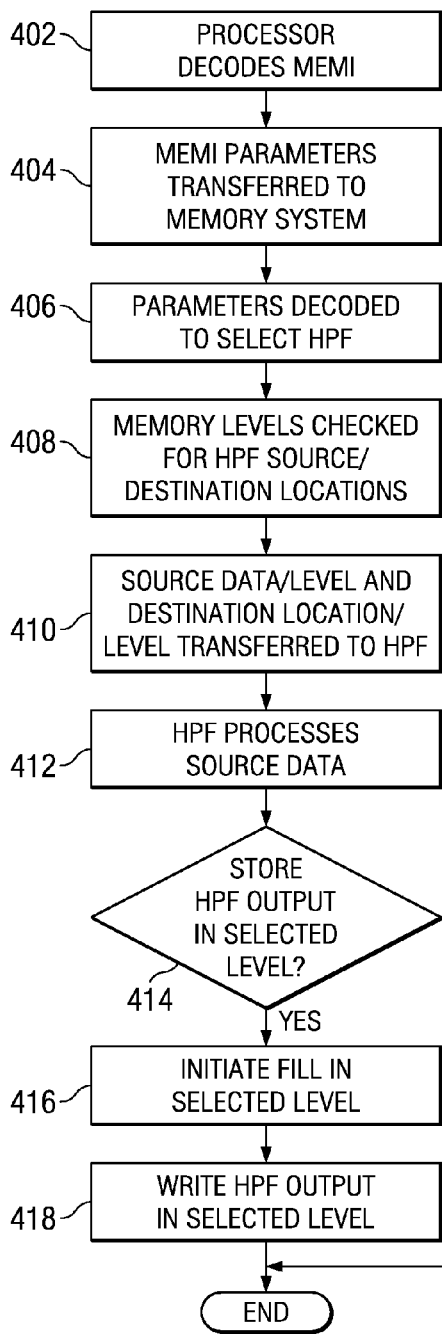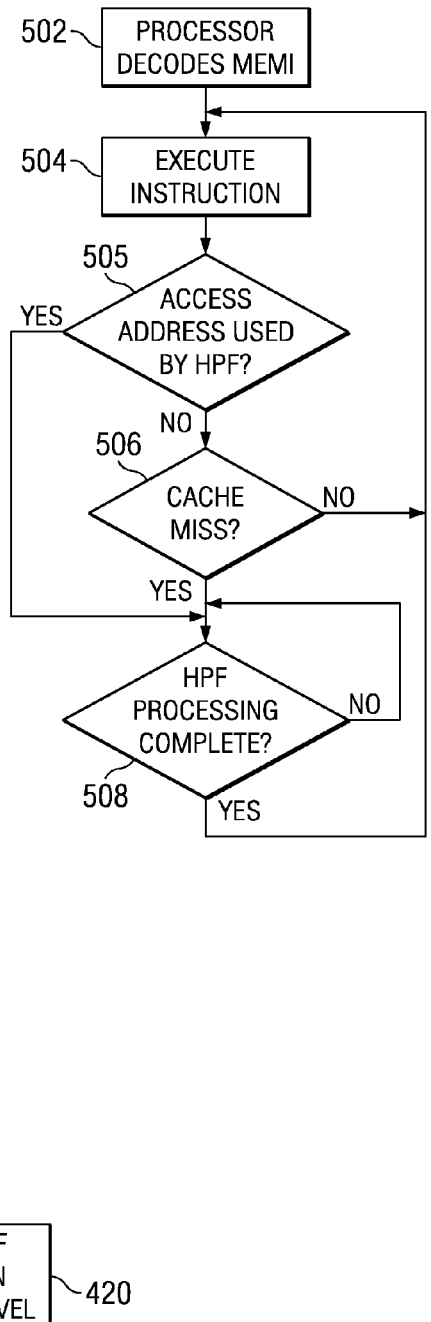

PROCESSING FUNCTION CONNECTED TO PROCESSOR MEMORY HIERARCHY

CROSS-REFERENCE TO RELATED APPLICATIONS

The present application claims priority to and incorporates by reference European patent application No. 07290587.0, filed on May 10, 2007.

BACKGROUND

With the proliferation of consumer electronics, microprocessor-based systems have become a ubiquitous part of modern society. Wireless communications devices, gaming systems, music players, and a host of other electronic devices rely on microprocessors and associated systems to perform control and data processing functions.

Microprocessor systems employ a variety of techniques to enhance functionality and improve performance. Hierarchical multi-level memory systems, cache memory systems, are often used to accelerate access to data and executable code. Cache memory systems attempt to store data in hierarchical memory levels according to the frequency at which the data is accessed by the microprocessor. The levels of the cache memory are tiered such that the smallest and lowest access time memory is closest to the microprocessor. Thus, cache memory level one, usually the smallest and highest performance cache memory, ideally contains the data values most frequently accessed by the microprocessor. Less frequently accessed data may be stored in successively lower cache levels or in main memory.

While cache memories can improve performance in microprocessor systems, their use is also susceptible to an assortment of inefficiencies that mitigate their effectiveness. Cache incoherency results when the levels of a hierarchical memory system contain disparate values corresponding to the same memory address. This problem often occurs when multiple devices have access to the various system memory levels and a value modification at one memory level leaves a stale value at other memory levels. Operations causing infrequently used data to displace frequently used data in lower memory levels (i.e. memory levels nearer the processor core) are also problematic as the displaced data must be re-fetched from slower memory. Such displacement of frequently used data with infrequently used data is known as cache pollution.

Microprocessor based systems also employ special purpose hardware, hardware accelerators, outside the microprocessor core to perform data manipulations that the processor core may perform less efficiently. Floating point accelerators and graphics accelerators are two examples of hardware accelerators. Because hardware accelerators perform memory accesses, their operation may introduce deleterious side effects, such as cache incoherency or cache pollution, that tend to reduce the effectiveness of hierarchical memory systems. Additionally, some hardware accelerator implementations may unduly burden the processor with control and synchronization.

SUMMARY

Accordingly, there are herein disclosed techniques for employing a Hardware Processing Function ("HPF") joined to a hierarchical memory system. In accordance with at least some embodiments a method includes execution of a data manipulation instruction by a hierarchical memory system. Execution of the instruction includes locating in the hierarchical memory system a source data value to be manipulated and locating a hierarchical memory level containing a destination storage location where a manipulated data value is to be stored. The source data value, an index identifying the hierarchical memory level of the destination storage location, a destination storage location address are transferred to a Hardware Processing Function coupled to the hierarchical memory system. Additional information may also be transferred to manage the cache memory hierarchy refill policy. The Hardware Processing Function manipulates the source data value to produce a manipulated data value. The manipulated data value is transferred to the destination storage location to complete the HPF processing.

In other embodiments, an apparatus includes a processor, a hierarchical memory system and a Hardware Processing Function. The processor and the one or more Hardware Processing Functions are coupled to the hierarchical memory system. The processor is configured to decode an instruction and the hierarchical memory system is configured to execute the instruction. The instruction directs the memory system to perform data manipulation. The processor transfers a value to the memory system. The value computed by the processor, comprises a location of source data to be manipulated, a selection of a Hardware Processing Function to perform a data manipulation, and a destination storage location where the manipulated data is to be stored.

In yet other embodiments, apparatus includes a hierarchical memory system and a Hardware Processing Function coupled to the hierarchical memory system. The memory system receives a value comprising a location of a source data to be manipulated, a selection of a Hardware Processing Function to perform the data manipulation, and a destination storage location where manipulated data is to be stored. The Hardware Processing Function manipulates source data read from the source data location.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which:

FIG. 4 shows a flow diagram for a method employing a hardware accelerator coupled to a hierarchical memory system in accordance with embodiments of the invention.

FIG. 5 shows a flow diagram for a method of regulating processor memory accesses when employing a hardware accelerator coupled to a hierarchical memory system in accordance with embodiments of the invention.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for employing a Hardware Processing Function ("HPF") in a processor system using hierarchical memory. A Hardware Processing Function comprises a hardware accelerator or hardware processing logic added to a microprocessor system to perform an operation that the processor core would perform less efficiently than the HPF. Examples of an HPF include an encryption/decryption engine, a compressor/decompressor, a dedicated signal processing function, etc. In preferred embodiments of the invention, a Hardware Processing Function is coupled to the hierarchical memory system rather than to a processor core, I/O bus, or memory bus. This arrangement allows for hardware acceleration without introducing detrimental cache memory side effects like incoherency and cache pollution, and without the addition of extra master ports on the memory hierarchy that would increase cache access latency. Moreover, because the HPF operation is synchronous with processor core instruction execution, no software overhead is incurred to synchronize processor core and HPF operation.

Figure 1:
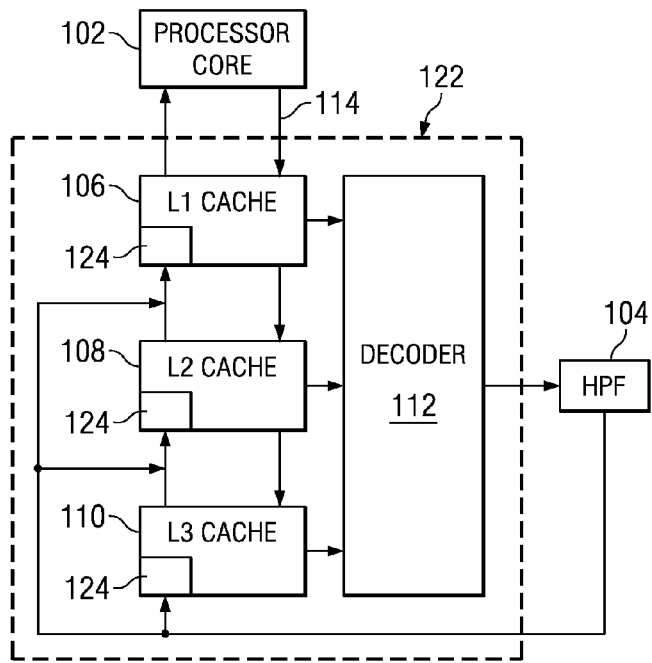
FIG. 1 shows an illustrative single processor system including a hierarchical memory system and a Hardware Processing Function in accordance with preferred embodiments of the invention.

FIG. 1 shows an illustrative microprocessor based system including a hierarchical memory system 122 and a Hardware Processing Function 104 in accordance with preferred embodiments of the invention. The processor core 102 may comprise any of a wide variety of processor devices including general purpose processors and digital signal processors. In this exemplary illustration, the hierarchical memory system 122 comprising a level one (L1) cache 106, a level two (L2) cache 108, and a level three (L3) cache 110 is coupled to the processor 102 by bus 114. The L3 cache may be connected to a main memory (not shown). Some or all of the cache memories 106, 108, 110 may be integrated with the processor core 102, or may be separate devices. Note that while three memory levels are illustrated, the presently disclosed invention is intended to support any number of memory levels. A decoder 112 is coupled to the cache memories 106, 108, 110, and an HPF 104 is coupled to the decoder 112.

The hierarchical memory system 122 comprising cache memories 106, 108, 110 serves to reduce memory access latency. Generally, both memory size and access time increase with cache level. When processor core 102 attempts a memory access, L1 cache 106, usually the smallest and fastest cache memory, is checked for the requested data. If L1 cache 106 contains the requested data, the access is completed and processing continues with minimal delay. If L1 cache 106 does not contain the data, L2 cache 108 is checked, and so on until the requested data is located. Embodiments of the invention maintain cache effectiveness by curtailing data movement between memory levels, thus reducing cache pollution, and by solving the cache coherence issue, a problem that has often required significant software management overhead.

In at least some embodiments, HPF 104 is a hardware accelerator configured to process data. Terms such as transform or manipulate may also be used to describe HPF operations, and the term manipulation as used herein includes any operation or transformation that may be performed on a data value, including a simple data displacement from memory to memory. HPF 104 may comprise logic which performs any of a variety of functions to offload processing from the processor core 102. An encryption engine is one example of an HPF. In the preferred embodiments of the invention, HPF 104 is attached to the hierarchical memory system 122 rather than to the processor core 102 or to a higher memory level bus as a separate master requiring its own memory access bus. By attaching the HPF 104 to the hierarchical memory system 122, in accordance with the present disclosure, many of the deleterious effects that the HPF 104 might otherwise have on cache memory are avoided. For example, connecting an HPF to a different memory layer than the layer to which the processor core 102 is connected may result in coherency issues. Decoder 112 selects an HPF to perform data manipulation and transfers parameters to the HPF 104 based on information received from the processor core 102 and the memory system, such as the memory level where an operand is found. In some embodiments the decoder 112 may be a component of the HPF 104.

In the preferred embodiments of the invention, an HPF 104 operation is initiated when the processor core 102 decodes a special type of instruction, a memory instruction ("MEMI") that is executed by the hierarchical memory system 122. The MEMI instruction selects an HPF to perform processing, when multiple HPFs are attached to the memory system, and specifies at least some of the parameters required for HPF operation. The MEMI instruction may be used to move data from a source address to a destination address with data processing performed by the HPF 104 during the transfer. The processing performed by the HPF 104 during the data transfer may be simple, for example a data alignment, or complex, for example, data encoding. The HPF 104 processing of the preferred embodiments is not restricted to processor pipeline execution cycles, but rather may be multi-cycle and pipelined as required to implement a particular HPF 104. From the processor core 102 point of view, a MEMI instruction is a single cycle instruction and is considered complete when sent to the memory hierarchy 122 even though the instruction may require a plurality of cycles to complete within the HPF 104.

The MEMI instruction may take a variety of forms and include one or more operands, for example:

Opcode [Data] Data may contain a command, which includes control information, and identify the HPF that is to execute the command. The Data field may, for example, be an immediate value or read from a processor register. This MEMI form may be used, for example, to transfer control information to the HPF.

Opcode [Source] [Data] Source may contain the address of a source operand. The data field may be as described above. This MEMI form may be used, for example, to transfer control information to the HPF.

Opcode [Source] [Dest] [Data] Source may contain the address of a source operand (data to be processed). Dest may contain the address where processed data is to be stored. The data field may be as described above.

When the processor core 102 decodes a MEMI instruction, it computes the value of the Data field and any required Source and Dest address values. The values are transferred to the hierarchical memory system 122 via the processor's memory bus 114, in the same way that the processor core 102 would perform a read or write operation. Using the Source and Dest addresses received from the processor core 102, the hierarchical memory system 122 locates the requested data. The source operand and the memory level where it is located are passed to the HPF 104. Likewise, the destination address, and the memory level where it is located are passed to the HPF 104. As the hierarchical memory system 122 searches for the requested data and a "miss" occurs, i.e. the data is not found at that particular memory level, no refill operation is performed. Thus data at the cache level of the miss is unaffected and the search continues at the next memory level, avoiding cache pollution.

The HPF 104 is a slave of the memory system 122. The data manipulation services provided by the HPF 104 are requested by the memory system 122 in conjunction with execution of a MEMI instruction by the memory system 122. The data processed by HPF 104 comes directly from the hierarchical memory system 122 rather than from the CPU pipeline. The HPF 104 begins data manipulation (e.g., data alignment, encryption, encoding, etc.) when it receives the necessary data from the hierarchical memory system 122. The manipulated data produced by HPF 104 is written to the destination address and memory level passed from the hierarchical memory system 122. Once written to the correct level of memory (caches or main memory) the manipulated data may be further processed by the processor core 102 or other systems. The cache write policy to be applied may be provided by the MEMI instruction. The write is performed through the cache refill ports 124, and therefore does not detrimentally affect cache electrical performance. Cache internal status indicating hit or miss at the write location is also unaffected. Thus alleviating the coherency problems encountered in systems implementing hardware accelerators with access to only higher levels of memory. Additionally, while the manipulated data may be written to the cache level where the destination address was located by the hierarchical memory system 122, controls may be provided to allow a cache refill whereby the manipulated data is written into a lower cache level than the level where the destination address was located. Because the manipulated data is written to the lowest memory level containing the destination address, or a lower level with refill mechanism, cache line data coherence is maintained.

Considering then the embodiment of FIG. 1, during execution of an instruction stream, the processor core 102 decodes a MEMI instruction. As part of MEMI decoding the processor 102 computes SOURCE and DEST addresses. These addresses along with control information, as outlined above, are transferred to the hierarchical memory system 122 for execution. The hierarchical memory system locates the SOURCE address in, for example, L2 cache. Thus L1 cache misses, but, in order to prevent cache pollution, no refill is requested to load the SOURCE data into L1 cache. The hierarchical memory system 122 further locates the DEST address in, for example, L3 cache. No fills are requested due to the L1 and L2 cache misses. The SOURCE operand located in L2 cache, and the DEST address and information regarding its memory level (L3 cache in this example) are transferred to the HPF 104 along with control parameters. The HPF 104 manipulates the source operand and the resultant manipulated data is written to the DEST address in L3 cache. The memory system subsequently writes the manipulated data to higher memory levels in accordance with its write protocol, thus maintaining memory system coherency and optimizing the efficiency of the hierarchical memory system.

After the processor core 102 decodes a MEMI instruction and initiates HPF 104 processing, the processor core 102 continues to execute instructions. From a system viewpoint, the HPF 104 operation is seen as an instruction decoded by the processor but executed by the hierarchical memory system 122. Execution is synchronous to the processor core 102, but without impact on the pipeline of the processor core 102. The processor views this instruction as executed immediately, similarly to write instruction execution. No polling operations that needlessly consume processor cycles, or difficult to debug interrupt services are required to synchronize the processor core 102 with the HPF 104.

In some embodiments, the hierarchical memory system 122 accepts sequential MEMI instructions without checking for completion of prior HPF 104 write operations before processing a read. However, in order to maintain processor/HPF synchronization, if during HPF 104 processing, the processor core 102 attempts to access a memory location being used by the HPF 104, for example, the destination address of an HPF 104 write, the processor core 102 may be forced to stall until the HPF 104 completes processing. The stall is provided by the memory system as a result of the HPF 104 being busy and the processor 102 trying to access the memory. Thus, synchronization is preserved with minimal effect on processor core 102 throughput.

In some embodiments, the processor core 102 may not be configured to decode MEMI instructions. These embodiments may, nonetheless, benefit by using hierarchical memory system 122 coupled to HPF 104. When processor core 102 is not configured to decode MEMI instructions, hierarchical memory system 122 may be configured to interpret other memory access instructions executed by the hierarchical memory system as MEMI instructions. For example, a store instruction having a destination address in a selected range may be interpreted by an appropriately configured hierarchical memory system 122 as a MEMI instruction. Thus, one or a sequence of memory access instructions transferred from the processor core 102 to the hierarchical memory system 122 may substitute for the MEMI instruction described above. The hierarchical memory system 122 may, in some embodiments, be dynamically configured by the processor core 102 to interpret selected memory accesses as MEMI instructions. In other embodiments, such configuration may be established by design, during testing, or otherwise as appropriate.

Figure 2:
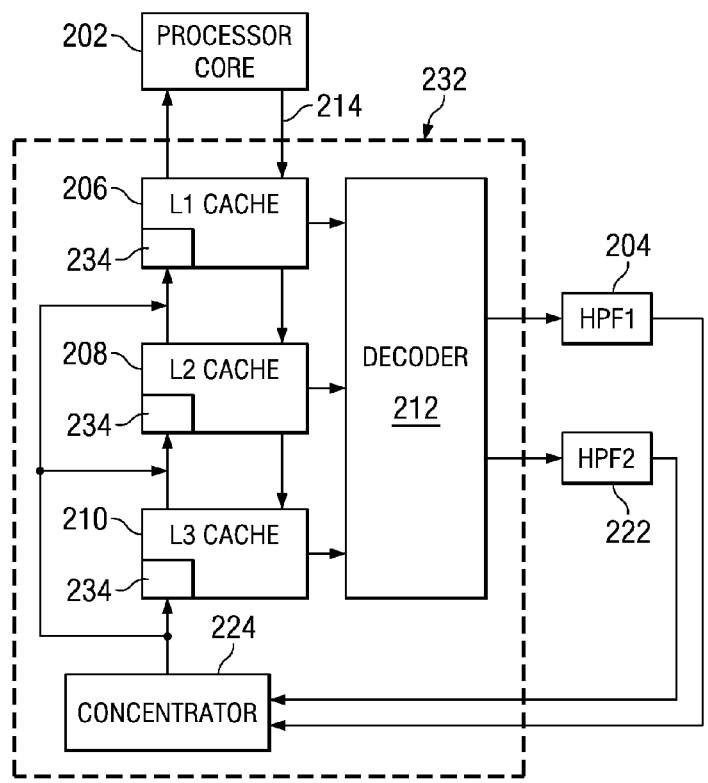
FIG. 2 shows an illustrative single processor system including a hierarchical memory system and multiple Hardware Processing Functions in accordance with preferred embodiments of the invention.

Because the HPF 104 is a slave, rather than a master of the hierarchical memory system 122, the HPF 104 is not connected to the hierarchical memory system 122 through an additional master port (i.e. a port allowing control of the memory system). Therefore, no additional constraints on cache TAG access timing are introduced. This allows multiple HPFs to be connected to a hierarchical memory system without detrimentally affecting memory timing. FIG. 2 shows an illustrative single processor system including a hierarchical memory system 232 and multiple Hardware Processing Functions 204, 222 in accordance with preferred embodiments of the invention. Processor core 202 is coupled, via address/data/control bus 214, to the hierarchical memory system 232 comprising level one (L1) cache 206, level two (L2) cache 208, and level 3 (L3) cache 210. Main memory (not shown) is coupled to the cache memories. Hardware Processing Functions, HPF1 204 and HPF2 222 are attached to the hierarchical memory system through decoder 212 and concentrator 224. Concentrator 224 manages data transfers from the HPFs 204, 222 to the hierarchical memory system 232. In some embodiments concentrator 224 may be a component of an HPF 204, 222. Decoder 212 selects an HPF 204, 222 to perform a data manipulation and routes data from memory to the selected HPF 204, 222.

When processor core 202 decodes a MEMI instruction, the processor 202 computes the source and destination addresses. The source and destination addresses, along with a DATA value containing command and control fields, are passed, via bus 214, to the hierarchical memory system 232 for execution. The Data value is passed to decoder 212 whereby the decoder 212 uses a field of the Data value to select a designated HPF, one of the HPFs 204, 222, to perform data manipulation. The source operand and the destination location are identified in the hierarchical memory system 232, and passed, along with the memory levels where they were found, to the designated HPF (204 for purposes of this explanation). The HFP 204 performs the manipulation and passes the resultant manipulated data and the destination address and memory level to the concentrator 224. The concentrator 224 is coupled to the cache memories through their refill ports 234. Manipulated data may be written to the destination address in the destination memory level passed to the HPF 204, or a refill operation may be performed to move the cache line of the destination address into a lower cache level and the manipulated data written into that lower cache level.

HPFs 204, 222 may be invoked by sequential MEMI instructions and thus simultaneously engaged in processing. However, in some embodiments, if the processor core 202 attempts to have a data manipulation performed by an HPF 204, 222 that is busy performing a previously dispatched operation, parameter transfers to the HPF 204, 222 may be stalled until the HPF 204, 222 completes the current operation. The stall in parameter transfer from the hierarchical memory system 232 to the HPF 204, 222 may, in turn, result in a stall of the processor core 202 until the current HPF 204, 222 operation is completed. In other embodiments, HPF 204, 222 may include a pipeline that queues multiple data manipulation requests to delay stall conditions. Absent stall conditions, the processor core 202 continues to execute instructions in parallel with HPF processing.

Figure 3:
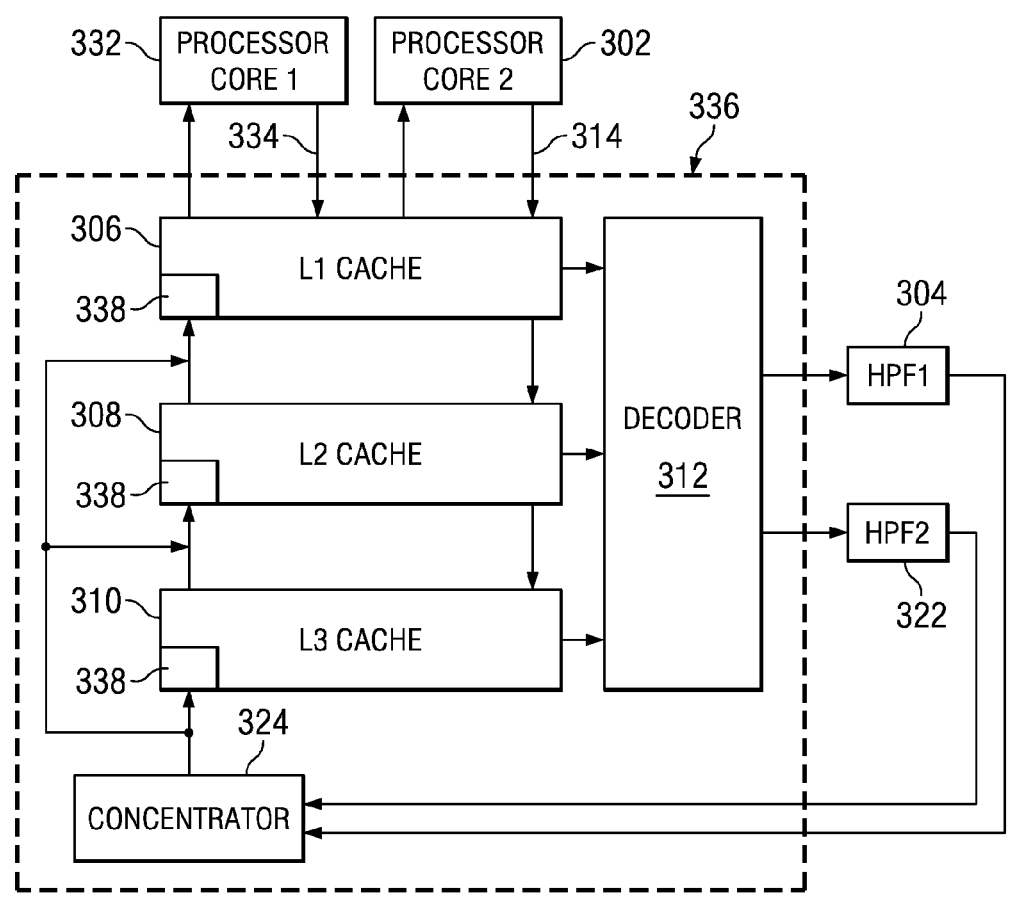
FIG. 3 shows as an illustrative multi-processor system including a hierarchical memory system and multiple Hardware Processing Functions in accordance with preferred embodiments of the invention.

FIG. 3 shows as an illustrative multi-processor system including a hierarchical memory system 336 and multiple Hardware Processing Functions 304, 322 in accordance with preferred embodiments of the invention. Processor core 1 332 and processor core 2 302 are configured as masters sharing the hierarchical memory system 336. Processor core 1 302 couples to the hierarchical memory system 336 through address/data/control bus 334, and processor core 2 332 couples to the hierarchical memory system 336 through address/data/control bus 314. The hierarchical memory system 336 comprises level one (L1) cache 306, level two (L2) cache 308, and level 3 (L3) cache 310. Main memory (not shown) may be coupled to the L3 cache memory 310. Hardware Processing Functions, HPF1 304 and HPF2 322 are attached to the hierarchical memory system 336 through decoder 312 and concentrator 324. Concentrator 324 manages data transfers from the HPFs 304, 322 to the cache memories 306, 308, 310. Processor core 1 332 and processor core 2 302 may execute independent instruction streams. Either processor core 302, 332 may decode a MEMI instruction, compute the source and destination addresses, and transfer the addresses along with command and control to the hierarchical memory system 336 for execution. The hierarchical memory system 336 locates the source data and the destination address and passes the operands and their memory levels to the HPF 304, 322 designated by the command/control value. The designated HPF (304 in this explanation) performs the required manipulation and transfers the resultant manipulated data to the concentrator 324 along with the destination address and memory level. Concentrator 324 couples to the cache memories L1 306, L2 308, and L3 310 through their refill ports 338. Manipulated data may be written to the destination address in the destination memory level passed to the HPF 304, or a refill operation may be performed to move the cache line of the destination address into a lower cache level and the manipulated data written into that lower cache level.

The processor cores 332, 302 may independently decode a MEMI instruction and pass the parameters to the hierarchical memory system 336 for execution. While that MEMI instruction executes, the processor cores 332, 302 may be precluded from accessing the addresses associated with the MEMI operands, i.e. the source or destination addresses, or from initiating a MEMI using a busy HPF 304, 322. Otherwise, the processor cores 332, 302 execute instructions and apply the HPFs 332, 302 in parallel without requirements for synchronization with the HPFs 322, 304.

FIG. 4 shows a flow diagram for a method employing an HPF attached to a hierarchical memory system to accelerate processing while maintaining cache coherency and preventing cache pollution. Though depicted sequentially, as a matter of convenience, at least some of the actions shown can be performed in a different order and/or performed in parallel. In block 402, a processor core coupled to the hierarchical memory system decodes a MEMI instruction. If required, the processor core computes the address of a source operand and/or the destination address where the result of HPF processing is to be stored. MEMI parameters, including, for example, the operand addresses and a DATA value containing command and control information, are transferred to the hierarchical memory system for execution in block 404.

In block 406, the hierarchical memory system decodes the Data value, and the HPF designated to perform a data manipulation is selected. The hierarchical memory system checks the various levels of memory for the addresses of the HPF source operand and output destination in block 408. The source operand is located and read from memory in block 410, and along with the memory level where it was located, passed to the designated HPF. The destination address and indicia of its memory level are also located and passed to the HPF.

When the designated HPF receives the necessary command and parameters, in block 412, the HPF processes the source data. In accordance with various embodiments of the HPF, a data value may be manipulated in any number of ways. The invention of the present disclosure is not limited to any particular HPF functions or embodiments, but rather is intended to encompass any and all HPF embodiments attached to a hierarchical memory system.

When HPF processing is complete, the manipulated data value is ready to be stored in memory. In block 414, a memory write component, such as a concentrator 224, determines whether the MEMI instruction specified a lower destination memory level for the manipulated data than the memory level where the destination address was located. If placement of the result in a lower memory level was specified, a refill request is issued, in block 416, for the level where the data is to be written, and the manipulated data is written to the lower memory level in block 418. If placement in a lower memory level was not specified in the MEMI instruction, in block 420, the manipulated data is written to the memory level where the destination address was previously located. Once written into memory, the manipulated data may be further processed by the processor or other systems.

FIG. 5 shows a flow diagram for a method of regulating processor memory accesses when employing a Hardware Processing Function coupled to a hierarchical memory system in accordance with embodiments of the invention. Though depicted sequentially, as a matter of convenience, at least some of the actions shown can be performed in a different order and/or performed in parallel. A processor core coupled to the hierarchical memory system decodes a MEMI instruction in block 502. The processor computes the MEMI parameters and transfers the parameters to the hierarchical memory system for execution. The processor does not stall waiting for the memory system to execute the MEMI, but rather continues executing subsequent instructions. In block 504, the processor executes a post-MEMI instruction. If, in block 505, the instruction attempts to access an address while the address is being used by an HPF, for example an HPF destination address, instruction execution will stall in block 508 until HPF processing is complete. Additionally, if, during HPF processing, execution of the instruction results in a cache miss in block 506, which raises the possibility that a cache line needed for HPF processing may be replaced, instruction execution may be stalled, in block 508, until HPF processing is complete. When a stall occurs, processing resumes in block 504 when HPF operations are complete.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, while embodiments of the invention have been described in relation to a hierarchical memory system employing three levels, the embodiments of the present disclosure are not so limited, and are applicable to hierarchical memory systems employing any number of levels. Accordingly, the scope of protection is not limited to the embodiments described herein, but is only limited by the claims which follow, the scope of which shall include all equivalents of the subject matter of the claims.

What is claimed is:

1. A method comprising:
Executing a data manipulation instruction by a hierarchical memory system, execution comprising:
    transferring the data manipulation instruction to the hierarchical memory system via a bus used to access cache memory of the hierarchical memory system;
    locating in the hierarchical memory system a source data value to be manipulated;
    locating in the hierarchical memory system a hierarchical memory level currently containing a destination storage location where a manipulated data value is to be stored;
    transferring from the hierarchical memory system to a Hardware Processing Function that is slave to, controlled by, and coupled to the hierarchical memory system, the source data value to be manipulated, an index identifying the located hierarchical memory level containing the destination storage location, and a destination storage location address;
    requesting processing of the transferred source data value by the Hardware Processing Function; and
    transferring the manipulated data value to the destination storage location.

2. The method of claim 1, further comprising manipulating the source data value by the Hardware Processing Function to produce the manipulated data value.

3. The method of claim 1, further comprising:
decoding an instruction in a processor core;
transferring the decoded instruction to the hierarchical memory system for execution; wherein the decoded instruction comprises:
    a selection of a Hardware Processing Function from a set of at least one Hardware Processing Functions coupled to the memory system, wherein the selected Hardware Processing Function is to perform a data manipulation;
    a command that describes the manipulation to be performed by the Hardware Processing Function
    an address of the source data value to be manipulated; and
    the address of the destination storage location where manipulated data is to be stored.

4. The method of claim 3, further comprising continuing processor core instruction execution while the Hardware Processing Function performs the data manipulation.

5. The method of claim 4, further comprising suspending processor core instruction execution until execution of a Hardware Processing Function is complete when the processor core attempts to access memory during execution of a Hardware Processing Function and a miss occurs, or when the processor core attempts to access memory during execution of a Hardware Processing Function and the access address is the destination storage location address where manipulated data to be produced by the executing Hardware Processing Function is to be stored.

6. The method of claim 1, further comprising transferring the manipulated data to the hierarchical memory level containing the destination storage location.

7. The method of claim 1, further comprising:
transferring the manipulated data to a different hierarchical memory level than the hierarchical memory level containing the destination storage location by:
    initiating a cache refill operation to load the destination storage location into the different hierarchical memory level; and
    transferring the manipulated data to the destination storage location in the different hierarchical memory level.

8. The method of claim 1 further comprising:
configuring the hierarchical memory system to interpret a memory access instruction as the data manipulation instruction; and
interpreting, by the hierarchical memory system, the memory access instruction transferred from a processor core to the hierarchical memory system for execution to be the data manipulation instruction while the processor core is not configured to interpret the memory access instruction as the data manipulation instruction.

9. A system comprising:
a processor core;
a hierarchical memory system coupled to the processor core; and
a Hardware Processing Function coupled to and controlled by the hierarchical memory system; and
wherein the processor core is configured to decode an instruction and the hierarchical memory system is configured to execute the instruction and wherein the instruction directs the hierarchical memory system to perform a processing function;

wherein the hierarchical memory system is configured locate and retrieve an operand from the hierarchical memory system, and to request processing of the retrieved operand by the Hardware Processing Function as part of execution of the instruction by the hierarchical memory system; and wherein the Hardware Processing Function is slave to the hierarchical memory system, and is configured to produce processed data from source data.

10. The system of claim 9, wherein the Hardware Processing Function processes data read from the source data location and transfers processed data to the destination storage location.

11. The system of claim 10, wherein the hierarchical memory system initiates a cache refill operation to write the processed data into a memory level.

12. The system of claim 9, wherein the processor core transfers a value to the hierarchical memory system, the value comprising: a location of source data to be processed, a selection of a Hardware Processing Function to perform the data processing, and a destination storage location where the processed data is to be stored.

13. The system of claim 12, wherein the hierarchical memory system determines a hierarchical memory level currently containing the source data location and a hierarchical memory level currently containing the destination storage location and transfers a value defining the hierarchical memory level currently containing the source data location and a value defining the hierarchical memory level currently containing the destination storage location to the Hardware Processing Function.

14. The system of claim 13, wherein the Hardware Processing Function processes the data and transfers the processed data to a different memory level than the memory level of the destination storage location.

15. The system of claim 9, wherein the hierarchical memory system further comprises a decoder for selecting a Hardware Processing Function and a concentrator for managing transfers of processed data from the at least one Hardware Processing Function to the memory system.

16. The system of claim 9, wherein the processor core continues to execute instructions while the Hardware Processing Function performs the data manipulation.

17. The system of claim 9, wherein the processor core temporarily suspends instruction execution when the processor core attempts to access memory and a cache miss occurs while a Hardware Processing Function is processing data, or when the processor core attempts to access memory during execution of a Hardware Processing Function and the access address is the address of the destination storage location where manipulated data to be produced by the executing Hardware Processing Function is to be stored.

18. A memory sub-system comprising:
a hierarchical memory system; and
a Hardware Processing Function is a slave to, is coupled to, and is controlled by the hierarchical memory system;
wherein the hierarchical memory system is configured to execute a data manipulation instruction received via a bus over which storage of the hierarchical memory system is accessed, and the Hardware Processing Function is configured to perform a data manipulation required by the instruction; and
wherein the hierarchical memory system is configured locate and retrieve an operand from the hierarchical memory system, and to request processing of the retrieved operand by the Hardware Processing Function as part of execution of the data manipulation instruction by the hierarchical memory system.

19. The system of claim 18, wherein the hierarchical memory system receives a value comprising a location of source data to be manipulated, a selection of a Hardware Processing Function to perform the data manipulation, and a destination storage location where manipulated data is to be stored, and determines the hierarchical memory level currently containing the source data location and the hierarchical memory level currently containing the destination storage location, and transfers a value defining the hierarchical memory level currently containing the source data location and a value defining the hierarchical memory level currently containing the destination storage location to the Hardware Processing Function.

20. The system of claim 19, wherein data manipulated by the Hardware Processing Function is transferred to the destination storage location.

21. The system of claim 19, wherein the Hardware Processing Function transfers manipulated data to a memory level other than the memory level determined for the destination storage location.

22. The system of claim 19, wherein the hierarchical memory system successively checks each memory level to determine the hierarchical memory level of the source data location and the hierarchical memory level of the destination storage location.

23. The system of claim 18, wherein the hierarchical memory system further comprises a decoder for selecting a Hardware Processing Function.

24. The system of claim 18, wherein the hierarchical memory system further comprises a concentrator for managing writes of manipulated data to the hierarchical memory system.

25. The system of claim 18, wherein the hierarchical memory system initiates a cache refill operation to write manipulated data into a memory level.

* * * * *